April 19, 1927.
L. C. KING
SPECTACLES
Filed Oct. 5, 1923
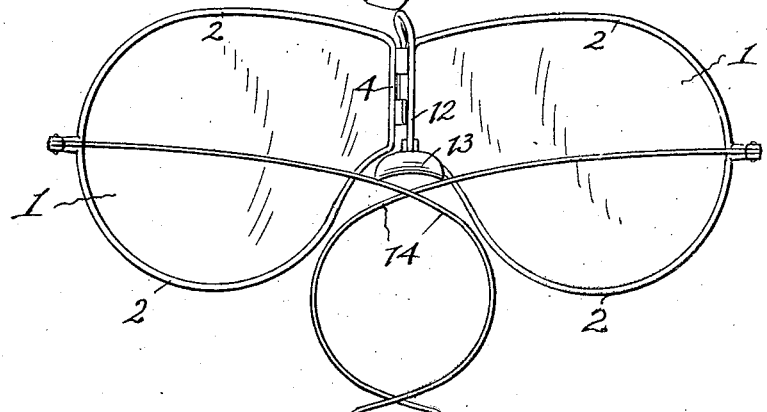
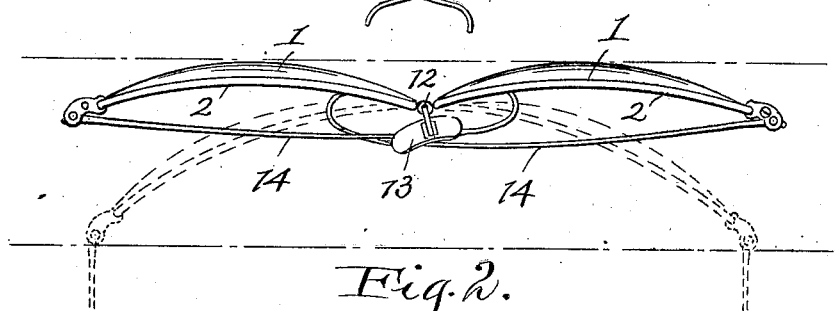
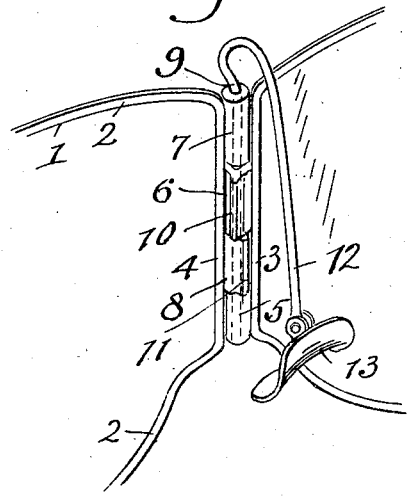 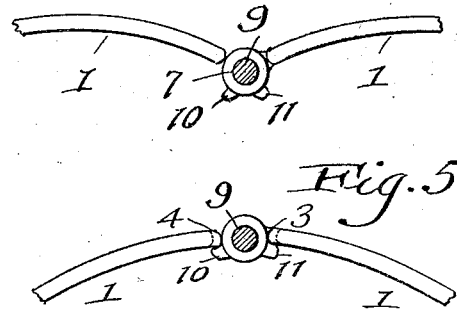
Inventor
Louise C. King
Thurston Kwis & Hudson
attys.

Patented Apr. 19, 1927.

1,625,614

UNITED STATES PATENT OFFICE.

LOUISE C. KING, OF CLEVELAND, OHIO.

SPECTACLES.

Application filed October 5, 1923. Serial No. 666,665.

This invention relates to spectacles, and more particularly to shooting spectacles or goggles in which relatively large lenses are mounted with their inner ends closely adjoining each other so that the range of vision is not restricted.

Spectacles of the type above referred to have heretofore been constructed with an integral frame which is bowed outwardly from end to end to conform to the face of the wearer and provided with a bridge spaced inwardly from a central portion of the frame so that the frame is spaced slightly from the face of the wearer when in use. While being worn, such spectacles meet the requirements perfectly, but due to the fact that the frame and lenses have considerable curvature, a rather bulky case has been required to hold the spectacles when not in use. Such a case is more inconvenient to carry and less effective for protecting the spectacles against damage than a smaller case. In some instances the lenses have been hingedly connected to permit them to be folded together when not in use, but such constructions have been open to the objection that the lenses are not rigidly held in proper position when in use.

It is an object of the present invention to provide a pair of spectacles in which the frame is rigidly supported out of contact with the face of the wearer exactly as in the integral frames heretofore used, but in which the two lenses are connected by a hinge which limits inward movement thereof, but permits sufficient pivotal movement in an outward direction to enable the spectacles to lie flat in a case, thus enabling the spectacles to be carried in a thinner case which will more effectually protect them against breakage.

A further object is to provide a simple and effective means for supporting the bridge from the hinge.

Other objects will be apparent from the following description and accompanying drawing.

The following description and accompanying drawing set forth in detail certain means embodying the invention, the disclosed means, however, constituting but one of the various mechanical forms in which the principle of the invention is employed.

Referring to the accompanying drawings forming a part of this specification, Fig. 1 is a rear elevation showing the spectacles folded for insertion into a spectacle case; Fig. 2 is a top plan view of the spectacles folded as in Fig. 1, and also showing in dotted lines the position of the lenses when the spectacles are in use; Fig. 3 is an enlarged perspective view showing the hinge connection and bridge; Figs. 4 and 5 are horizontal sections showing the positions of the lenses and hinge shoulders when folded and when in use.

Referring to the accompanying drawing, the two lenses 1 are enclosed within narrow rims 2 and at their inner ends are formed to provide two parallel closely adjoining edge portions 3 and 4 which are hingedly connected. The rim of one of the lenses along the edge portion 3 thereof is provided with a pair of hinged knuckles 5 and 6 which are integrally connected thereto and the corresponding edge portion 4 of the other lens rim has integrally connected thereto hinged knuckles 7 and 8 which interfit with the hinged knuckles 5 and 6. The hinge connection is completed by means of a hinge pin 9 which passes through the interfitting knuckles of the two rims. The hinged knuckles 6 and 8 carried by the edge portions 3 and 4 of the two rims are provided with shoulders 10 and 11 which engage with the inner sides of the two rims to limit the pivotal movement of the lenses in an inward direction. The shoulders 10 and 11 are so positioned that when they are in engagement with the two rims of the lenses, the curvature of one lens is practically a continuation of the curvature of the other lens, the frame in this position being substantially the same shape as the rigid frames heretofore used. The hinged pin 9 is preferably fixed to one of the hinged sections of the frame and has a portion projecting upwardly beyond the upper end of the hinge. This projecting portion is bent rearwardly and downwardly to provide a supporting arm 12 for a bridge 13 which is pivotally connected to the lower end of the arm.

When in use the bridge 13 engages the nose of the wearer holding the central portion of the frame spaced from the face of the wearer, and the bows 14 hold the lenses in the position shown in dotted lines in Fig. 2 and in full lines in Fig. 5, in which positions the lugs 10 and 11 engage with the rims of the lenses and hold the lenses against further inward movement so that the outer end portions of the lenses are held out of contact with the face of the wearer and the two lenses are solidly held in proper position as effectively as when a rigid frame is employed.

Having described my invention, I claim—

1. A device of the character described comprising a pair of closely adjoining rigid lenses each having a rim member secured to the edge thereof adjoining the other lens, interfitting hinge knuckles carried by the rim members, a hinge pin passing through the knuckles, a knuckle carried by one rim member having a shoulder engageable with the inner side of the other rim member and so positioned as to limit the inward pivotal movement of the lenses past a position in which the lenses are in alignment and a bridge carried by the hinge pin and adjustable toward and from the inner side of the hinge.

2. A device of the character described comprising a pair of lenses, a pair of interfitting hinge members one secured to each lens, a hinge pin connecting said hinge members, said hinge pin at its upper end projecting beyond the hinge members, the projecting portion of the hinge pin being bent inwardly and downwardly and extending to adjacent the lower end of the hinge, the projecting portion of the hinge pin being bendable to position the bridge at different distances from the inner side of the hinge, and a bridge pivotally connected to the lower end of the projecting portion of the hinge pin.

In testimony whereof, I hereunto affix my signature.

LOUISE C. KING.